(12) United States Patent
Liu et al.

(10) Patent No.: US 12,294,301 B2
(45) Date of Patent: May 6, 2025

(54) POWER SUPPLY CIRCUIT AND LIGHT-EMITTING DIODE (LED) DRIVING SYSTEM USING POWER SUPPLY CIRCUIT

(71) Applicant: Joulwatt Technology Co., Ltd., Hangzhou (CN)

(72) Inventors: Guoqiang Liu, Hangzhou (CN); Yingyan He, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 234 days.

(21) Appl. No.: 18/138,353

(22) Filed: Apr. 24, 2023

(65) Prior Publication Data

US 2023/0344341 A1     Oct. 26, 2023

(30) Foreign Application Priority Data

Apr. 22, 2022   (CN) .......................... 202210428829.6

(51) Int. Cl.
| | |
|---|---|
| *H02M 3/158* | (2006.01) |
| *H02M 1/00* | (2007.01) |
| *H05B 45/10* | (2020.01) |
| *H05B 45/3725* | (2020.01) |
| *H05B 45/395* | (2020.01) |

(52) U.S. Cl.
CPC ......... *H02M 3/158* (2013.01); *H02M 1/0045* (2021.05); *H05B 45/10* (2020.01); *H05B 45/3725* (2020.01); *H05B 45/395* (2020.01)

(58) Field of Classification Search
CPC .... H02M 3/158; H02M 1/0045; H02M 1/007; H02M 1/36; H02M 7/06; H02M 1/32; H02M 3/156; H05B 45/10; H05B 45/3725; H05B 45/395; H05B 45/37; H05B 45/30
See application file for complete search history.

(56) References Cited

U.S. PATENT DOCUMENTS

2019/0207532 A1*  7/2019  Ramadass ............... H02M 1/42

* cited by examiner

*Primary Examiner* — Metasebia T Retebo
(74) *Attorney, Agent, or Firm* — Bayramoglu Law Offices LLC (57) ABSTRACT

A power supply circuit and a light-emitting diode (LED) driving system using the power supply circuit are provided. The power supply circuit includes a linear conversion circuit, a first capacitor, and a direct current-direct current (DC-DC) conversion circuit, where an alternating current input signal is rectified to form a first rectified voltage. The linear conversion circuit receives the first rectified voltage and has an output terminal connected to the first capacitor. After the power supply circuit is started, the linear conversion circuit controls the first rectified voltage to charge the first capacitor in a time period when the first rectified voltage is near a trough. The DC-DC conversion circuit receives a first capacitor voltage and performs power conversion to output a supply voltage. At least part of the linear conversion circuit and at least part of the DC-DC conversion circuit can be integrated with an LED driving circuit.

18 Claims, 4 Drawing Sheets

POWER SUPPLY CIRCUIT AND LIGHT-EMITTING DIODE (LED) DRIVING SYSTEM USING POWER SUPPLY CIRCUIT

CROSS REFERENCE TO THE RELATED APPLICATIONS

This application is based upon and claims priority to Chinese Patent Application No. 202210428829.6, filed on Apr. 22, 2022, the entire contents of which are incorporated herein by reference.

TECHNICAL FIELD

The present disclosure relates to the field of electronic circuits and in particular to a power supply circuit and a light-emitting diode (LED) driving system using the power supply circuit.

BACKGROUND

Figure 1:
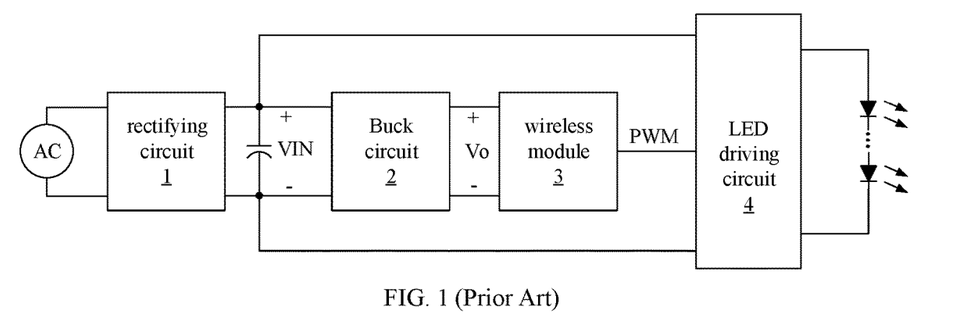
FIG. 1 is a circuit diagram of a light-emitting diode (LED) driving system in the prior art.
Figure 2:
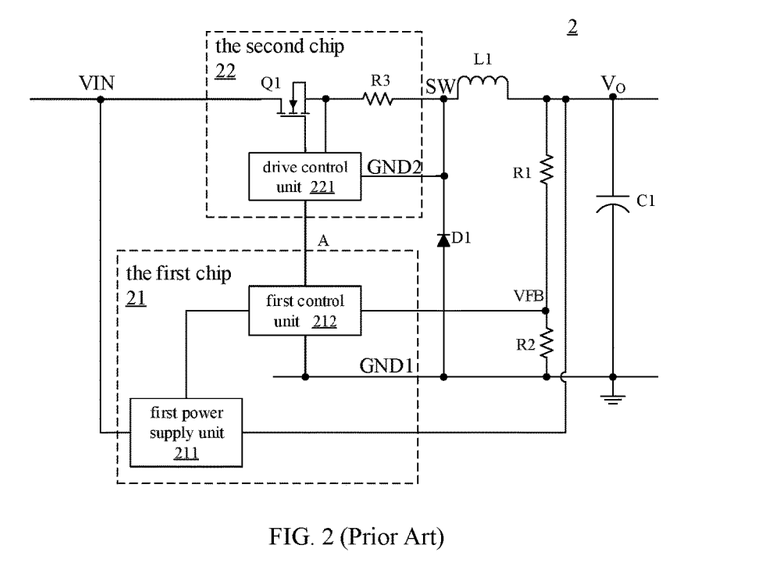
FIG. 2 is a schematic diagram of a Buck circuit shown in FIG. 1.
Figure 3:
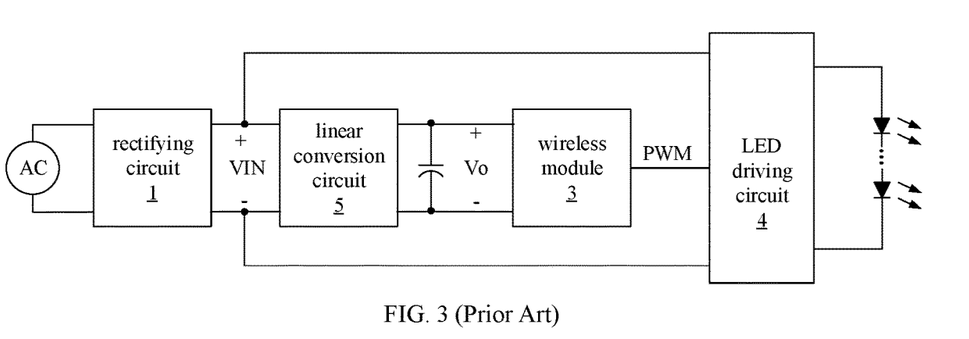
FIG. 3 is a circuit diagram of another LED driving system in the prior art.

There are two power supply solutions involved in the existing intelligent lighting power supply technology, namely, a single-stage Buck power supply solution and a single-stage linear power supply solution. As shown in FIG. 1, in the single-stage Buck power supply solution, the Buck circuit 2 forms the power supply part. The rectifying circuit 1 rectifies the alternating current (AC) input signal from the AC power supply and outputs a rectified voltage VIN. The Buck circuit 2 converts the rectified voltage VIN into a supply voltage Vo required by the wireless module 3. FIG. 2 shows the structure of the Buck circuit 2. As shown in FIG. 3, in the single-stage linear power supply solution, the linear conversion circuit 5 forms the power supply part. The rectifying circuit 1 rectifies the AC input signal from the AC power supply and outputs a rectified voltage VIN. The linear conversion circuit 5 converts the rectified voltage VIN into a supply voltage Vo required by the wireless module 3. Compared with the single-stage linear power supply solution shown in FIG. 3, the single-stage Buck power supply solution shown in FIG. 1 has the advantage of higher conversion efficiency. However, the single-stage Buck power supply solution has a more complex circuit structure and can hardly improve the integration, which hinders miniaturization and limits some application scenarios, such as drive in the lamp base. There are several reasons why integration can hardly be improved. 1. The input-output voltage difference is large, and it is hard to increase the switching frequency under a certain minimum on time, which does not meet the requirement for high switching frequency and results in the large size of the energy storage device such as inductor L1. 2. As shown in FIG. 2, the switch transistor Q1 is on the high side and its ground is not connected to the output terminal. Due to the package limitation, it is hard to further integrate the switch transistor with the LED driving circuit of the next stage. On the other hand, in the single-stage Buck power supply solution, the Buck circuit 2 generally adopts the dual-chip solution shown in FIG. 2. The reference ground GND1 of the first chip 21 forms the ground of the Buck circuit 2, and the reference ground GND2 of the second chip 22 forms the switch node SW. Therefore, packaging the first chip 21 and the second chip 22 in the same package requires at least a double-pad frame, which is expensive. As shown in FIG. 3, the single-stage linear power supply solution has a relatively simple circuit structure, but its efficiency is low, and it is generally suitable for applications with an output current below 20 mA, rather than high-current applications. Therefore, it is necessary to propose an optimized power supply solution to reduce the cost and improve both efficiency and integration.

SUMMARY

Given this, an objective of the present disclosure is to provide a power supply circuit and a light-emitting (LED) driving system using the power supply circuit to solve the technical problem that the power supply circuit in the prior art cannot meet the requirements of high conversion efficiency and high integration.

The present disclosure provides the following technical solution. An aspect of the present disclosure provides a power supply circuit, which is configured to provide a supply voltage for a load and includes a linear conversion circuit, a first capacitor, and a direct current-direct current (DC-DC) conversion circuit, where an alternating current (AC) input signal is rectified to form a first rectified voltage.

The linear conversion circuit receives the first rectified voltage and has an output terminal connected to the first capacitor. After the power supply circuit is started, the linear conversion circuit controls the first rectified voltage to charge the first capacitor in a time period when the first rectified voltage is near a trough.

The DC-DC conversion circuit receives a first capacitor voltage and performs power conversion to output the supply voltage.

Optionally, the linear conversion circuit controls the charging of the first capacitor to start when a first rectified voltage sampled signal drops to a first threshold. Alternatively, the linear conversion circuit controls the charging of the first capacitor to start when the first rectified voltage sampled signal drops to the first threshold or a first capacitor voltage sampled signal is less than a third threshold.

Optionally, the linear conversion circuit controls the charging of the first capacitor to stop when the first capacitor voltage sampled signal rises to a second threshold.

the first threshold is adjusted according to the first rectified voltage sampled signal at the time when charging the first capacitor is stopping. Alternatively, the first threshold is adjusted according to the first capacitor voltage sampled signal at the time when charging the first capacitor is starting.

Optionally, the linear conversion circuit controls the charging of the first capacitor to stop when the first rectified voltage sampled signal rises to a fourth threshold.

The first threshold is adjusted according to the first capacitor voltage sampled signal at the time when charging the first capacitor is starting. Alternatively, the first threshold is adjusted according to the first capacitor voltage sampled signal at a time when charging the first capacitor is stopping.

Optionally, the linear conversion circuit controls the first threshold to decrease when the first threshold is greater than a first voltage and controls the first threshold to increase when the first threshold is less than the first voltage, where the first voltage is a voltage value of the first rectified voltage sampled signal at the time when charging the first capacitor is stopping.

Optionally, the DC-DC conversion circuit includes a switch circuit and a second control circuit. The switch circuit includes a second switch transistor on the high side and a third switch transistor on the low side; the second control circuit generates a second switch signal according to an output feedback signal of the DC-DC conversion circuit to control the on and off of the second switch transistor.

Optionally, the second control circuit and the second switch transistor are integrated on the same chip or in the same single-pad package.

Optionally, at least part of the linear conversion circuit is integrated into the chip or in the package.

Optionally, the linear conversion circuit includes a first switch transistor and a first control circuit.

The first switch transistor has a first power terminal for receiving the first rectified voltage and a second power terminal connected to the first capacitor.

the first control circuit includes a first switch control circuit, which receives the first rectified voltage and the first capacitor voltage to generate a first switch signal. The first control circuit generates a first control signal according to the first switch signal. The first switch transistor further has a control terminal for receiving the first control signal. The first control signal controls the on and off of the first switch transistor according to the first switch signal.

Optionally, the first switch control circuit includes:

an input voltage sampling circuit configured to sample the first rectified voltage to output the first rectified voltage sampled signal and a first voltage, which is a voltage value of the first rectified voltage sampled signal at a time when the first switch transistor is starting to turn off;

a first threshold generating circuit configured to output the first threshold and adjust the first threshold according to the first voltage;

a first comparison circuit having a first input terminal for receiving the first threshold and a second input terminal for receiving the first rectified voltage sampled signal and generating a first on signal according to a comparison result between the first rectified voltage sampled signal and the first threshold;

a first capacitor voltage sampling circuit configured to sample the first capacitor voltage to output the first capacitor voltage sampled signal;

a second comparison circuit having a first input terminal for receiving the first capacitor voltage sampled signal and a second input terminal for receiving a second threshold and generating a first off signal according to a comparison result between the first capacitor voltage sampled signal and the second threshold; and a first logic circuit configured to receive the first on signal and the first off signal to output a first signal, where the first switch control circuit outputs the first signal as the first switch signal.

Optionally, the first switch control circuit further includes:

a third comparison circuit having a first input terminal for receiving the third threshold and a second input terminal for receiving the first capacitor voltage sampled signal and generating a second signal according to a comparison result between the first capacitor voltage sampled signal and the third threshold and a first OR logic circuit having a first input terminal for receiving the first signal and a second input terminal for receiving the second signal and performing an OR logic operation on the first signal and the second signal, where the first switch control circuit takes an output signal of the first OR logic circuit as the first switch signal to output.

Optionally, the first control circuit outputs the first switch signal as the first control signal.

Optionally, the first control circuit further includes a current limiting circuit, which is configured to limit a current when the first switch transistor is on, sample a current of the first switch transistor to acquire a first sampled signal, and output the first control signal according to the first sampled signal and the first switch signal.

Optionally, the DC-DC conversion circuit includes a switch circuit and a second control circuit. The switch circuit includes a second switch transistor on the high side and a third switch transistor on the low side. The second control circuit generates a second switch signal according to an output feedback signal of the DC-DC conversion circuit to control the on and off of the second switch transistor.

The second control circuit, the second switch transistor, and the first switch transistor are integrated on the same chip or in the same single-pad package.

Optionally, the DC-DC conversion circuit is a Buck circuit.

Optionally, the first capacitor voltage is 30-70 V.

Another aspect of the present disclosure provides an LED driving system, which includes a rectifying circuit, a wireless module, an LED driving circuit, and the power supply circuit, where the rectifying circuit is connected to an AC input power supply and is configured to rectify an AC input signal and output the first rectified voltage;

the power supply circuit is configured to receive the first rectified voltage and output the supply voltage for supplying power to the wireless module;

the wireless module is configured to output a dimming signal; and the LED driving circuit is configured to provide a driving current for an LED load and receive the dimming signal to adjust the driving current.

Optionally, at least part of the linear conversion circuit, at least part of the DC-DC conversion circuit, and at least part of the LED driving circuit are integrated on the same chip or in the same single-pad package.

Optionally, the second control circuit, the second switch transistor, the first switch transistor, and at least part of the LED driving circuit are integrated on the same chip or in the same single-pad package.

Optionally, the rectifying circuit includes a rectifier bridge.

The rectifier bridge receives the AC input signal to output the first rectified voltage, and the LED driving circuit has an input terminal for receiving the first rectified voltage.

Optionally, the rectifying circuit includes a rectifier bridge and a unidirectional conducting device.

The rectifier bridge receives the AC input signal to output a second rectified voltage, and the LED driving circuit has an input terminal for receiving a second rectified voltage.

The unidirectional conducting device has a positive electrode connected to one terminal of the AC input power supply and a negative electrode connected to the first input terminal of the power supply circuit. A second input terminal of the power supply circuit is grounded.

Optionally, the wireless module includes at least one of a wireless fidelity (Wi-Fi) module, a Bluetooth module, and a ZigBee module.

Compared with the prior art, the power supply circuit of the present disclosure has the following advantages. The present disclosure improves the conversion efficiency, which is close to or even exceeds that of the single-stage Buck power supply solution. The present disclosure can adopt a single-pad frame for packaging integration, which reduces the packaging cost. The present disclosure improves the system frequency, and the size (e.g., volume) of the energy storage device is greatly reduced compared with that in the single-stage Buck power supply solution, thereby reducing the cost, improving the integration, and realizing miniaturization. In the LED driving system using the power supply circuit, at least part of the linear conversion circuit and at least part of the DC-DC conversion circuit can be integrated with the LED driving circuit on the same chip or in the same single-pad package. Therefore, the system is simpler, has lower costs, and meets the requirements of high conversion efficiency and high integration.

DETAILED DESCRIPTION OF THE EMBODIMENTS

The preferred embodiments of the present disclosure are described in detail below with reference to the drawings, but the present disclosure is not limited to these embodiments. The present disclosure covers any substitutions, modifications, equivalent methods, and solutions made within the spirit and scope of the present disclosure.

For a better understanding of the present disclosure, the specific details of the following preferred embodiments of the present disclosure are explained hereinafter in detail although the present disclosure can also be fully understood by those skilled in the art without the description of these details.

The present disclosure is described in detail by giving examples and referring to the drawings. It should be noted that the drawings are simplified and do not use accurate proportions, that is, the drawings are merely for the objectives of conveniently and clearly assisting in illustrating the embodiments of the present disclosure.

Figure 4:
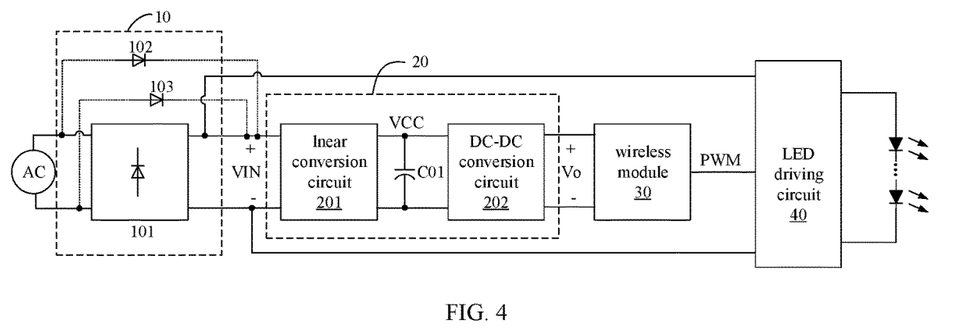
FIG. 4 is a schematic diagram of an LED driving system according to an embodiment of the present disclosure.

As shown in FIG. 4, an embodiment of the present disclosure provides an LED driving system. The LED driving system includes rectifying circuit 10, power supply circuit 20, wireless module 30, and LED driving circuit 40. The rectifying circuit 10 is connected to an AC input power supply and is configured to rectify an AC input signal and output first rectified voltage VIN. The power supply circuit 20 is configured to receive the first rectified voltage VIN and output supply voltage Vo for supplying power to the wireless module 30. The wireless module 30 is configured to output a dimming signal (pulse width modulation (PWM)). The LED driving circuit 40 is configured to provide a driving current for an LED load and receive the dimming signal (PWM) to adjust the driving current. Specifically, in an embodiment, the rectifying circuit 10 includes rectifier bridge 101. The rectifier bridge 101 receives the AC input signal and outputs the first rectified voltage VIN, and an input terminal of the power supply circuit 20 and an input terminal of the LED driving circuit 40 receive the first rectified voltage VIN. In this embodiment, the first rectified voltage VIN received by the input terminal of the power supply circuit 20 is a voltage generated by a full wave rectification of the AC input signal. In another embodiment, the rectifying circuit includes the rectifier bridge 101 and a unidirectional conducting device. The rectifier bridge 101 receives the AC input signal and outputs a second rectified voltage, and the input terminal of the LED driving circuit receives the second rectified voltage. The unidirectional conducting device has a positive electrode connected to one terminal of the AC input power supply and a negative electrode connected to the first input terminal of the power supply circuit 20. A second input terminal of the power supply circuit 20 is grounded. As a further example, the unidirectional conducting device may be first diode 102 or second diode 103 indicated by the dotted line shown in FIG. 4. In this embodiment, the first rectified voltage VIN received by the input terminal of the power supply circuit 20 is a voltage generated by the half-wave rectification of the AC input signal. The power supply circuit 20 includes linear conversion circuit 201, first capacitor C01, and DC-DC conversion circuit 202. The linear conversion circuit 201 receives the first rectified voltage VIN and has an output terminal connected to the first capacitor C01. After the power supply circuit 20 is started, the linear conversion circuit 201 controls the first rectified voltage VIN to charge the first capacitor C01 in a time period when the first rectified voltage VIN is near a trough. The DC-DC conversion circuit 202 receives first capacitor voltage VCC and performs power conversion to output the supply voltage Vo. The wireless module 30 includes at least one of a wireless fidelity (Wi-Fi) module, a Bluetooth module, and a ZigBee module.

After the power supply circuit 20 is started, the linear conversion circuit 201 controls the first rectified voltage VIN to charge the first capacitor C01 in the time period when the first rectified voltage VIN is near the trough to improve the conversion efficiency. In an embodiment, the linear conversion circuit 201 controls the charging of the first capacitor C01 to start when a first rectified voltage sampled signal drops to a first threshold. In another embodiment, the linear conversion circuit controls the charging of the first capacitor C01 to start when the first rectified voltage sampled signal drops to the first threshold or a first capacitor voltage sampled signal is less than a third threshold. In an embodiment, the linear conversion circuit 201 controls the charging of the first capacitor C01 to stop when the first capacitor voltage sampled signal rises to a second threshold. In another embodiment, the linear conversion circuit controls the charging of the first capacitor C01 to stop when the first rectified voltage sampled signal rises to a fourth threshold. Further, the first capacitor C01 can be charged more efficiently by dynamically adjusting the first threshold to further improve the conversion efficiency of the linear conversion circuit 201. For example, in the embodiment where the linear conversion circuit controls the charging of the first capacitor to stop when the first capacitor voltage sampled signal rises to the second threshold, the first threshold is adjusted according to the first rectified voltage sampled signal at the time when charging the first capacitor C01 is stopping. Specifically, when the first threshold is greater than the first voltage, the first threshold is controlled to decrease. When the first threshold is less than the first voltage, the first threshold is controlled to increase. The first voltage is a voltage value of the first rectified voltage sampled signal at the time when charging the first capacitor is stopping.

In an embodiment, the first capacitor voltage VCC is 30-70 V. Preferably, the first capacitor voltage VCC is 40-60 V. In an embodiment, the DC-DC conversion circuit is a Buck circuit, which performs power conversion on the first capacitor voltage VCC to output, for example, a 5 V or 3.3 V supply voltage Vo. Compared with the Buck circuit 2 in the prior art as shown in FIG. 1, the maximum input voltage of the DC-DC conversion circuit 202 in the power supply circuit 20 of the present disclosure is greatly reduced. Therefore, the DC-DC conversion circuit 202 can be prepared by a low-cost manufacturing process, rather than a high-voltage manufacturing process that has a high cost. On the other hand, the maximum input-output voltage difference of the DC-DC conversion circuit 202 is also greatly reduced. Therefore, the switching frequency and conversion efficiency of the DC-DC conversion circuit 202 can be improved, and the volume of the energy storage device can be greatly reduced, thereby reducing cost, improving integration, and realizing miniaturization. In addition, the design can realize single-pad packaging to reduce packaging costs. Compared with the linear conversion circuit 5 in the prior art as shown in FIG. 3, the input-output voltage difference of the linear conversion circuit 201 of the present disclosure is reduced, and the first rectified voltage VIN charges the first capacitor C01 in the time period when the first rectified voltage VIN is near the trough, thereby improving the conversion efficiency. Furthermore, the conversion efficiency of the linear conversion circuit 201 can be further improved by dynamically adjusting the first threshold. Combining the high conversion efficiency of the DC-DC conversion circuit 202 and the high conversion efficiency of the linear conversion circuit 201 in the present disclosure, the total conversion efficiency of the power supply circuit 20 can approach or even exceed the conversion efficiency of the single-stage Buck power supply solution in the prior art.

Figure 5:
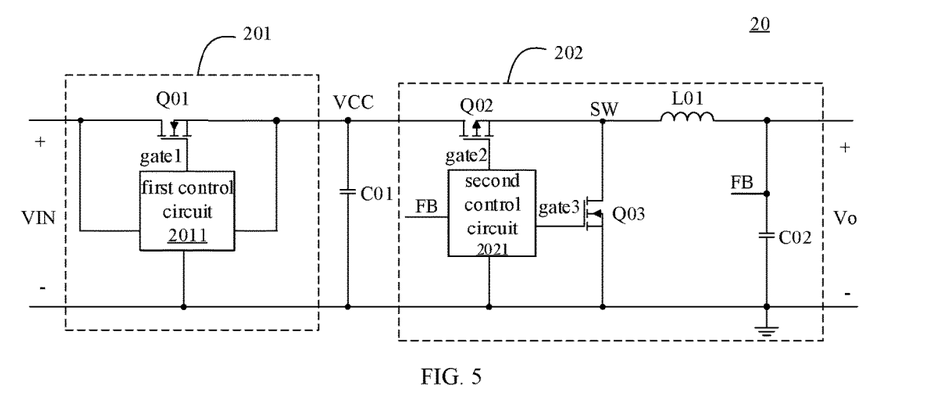
FIG. 5 is a structural diagram of a power supply circuit according to an embodiment of the present disclosure.

Referring to FIG. 5, in an embodiment, the linear conversion circuit 201 includes first switch transistor Q01 and first control circuit 2011. The first switch transistor Q01 has a first power terminal for receiving the first rectified voltage VIN and a second power terminal connected to the first capacitor C01. The first control circuit 2011 receives the first rectified voltage VIN and the first capacitor voltage VCC to generate a first control signal gate1, and the first switch transistor Q01 further has a control terminal for receiving the first control signal gate1. The DC-DC conversion circuit 202 includes a switch circuit and second control circuit 2021. The switch circuit includes second switch transistor Q02 on the high side, third switch transistor Q03 on the low side, first inductor L01, and second capacitor C02. The second control circuit 2021 generates second switch signal gate2 according to the output feedback signal FB of the DC-DC conversion circuit 202 to control the on and off of the second switch transistor Q02. In an embodiment, the third switch transistor Q03 can be a synchronous rectification metal oxide semiconductor (MOS) transistor as shown in FIG. 5. In another embodiment, the third switch transistor can also be a freewheeling diode. In an embodiment, the second control circuit 2021 and the second switch transistor Q02 in the DC-DC conversion circuit 202 can be integrated into the same chip. In another embodiment, the second control circuit 2021 and the second switch transistor Q02 can be integrated on different chips and packaged in the same package. The packaging can be completed by a single-pad frame. When the third switch transistor Q03 is a synchronous rectification MOS transistor, in an embodiment, the second control circuit 2021, the second switch transistor Q02, and the third switch transistor Q03 can be integrated into the same chip. In another embodiment, the second control circuit 2021, the second switch transistor Q02, and the third switch transistor Q03 can be integrated on different chips and packaged in the same package. The packaging can be completed by a single-pad frame. When the third switch transistor Q03 is a freewheeling diode, in an embodiment, the second control circuit 2021 and the second switch transistor Q02 can be integrated on the same chip and packaged in the same package with the third switch transistor Q03. The packaging can be completed by a single-pad frame. In another embodiment, the second control circuit 2021 and the second switch transistor Q02 can be integrated on different chips respectively, and packaged in the same package with the third switch transistor Q03. The packaging can be completed by a single-pad frame. In addition, the linear conversion circuit 201 can be fully or partially integrated with at least part of the DC-DC conversion circuit 202. For example, in an embodiment, the second control circuit 2021, the second switch transistor Q02, and the first switch transistor Q01 can be integrated into the same chip. In another embodiment, the second control circuit 2021, the second switch transistor Q02, and the first switch transistor Q01 can also be integrated on different chips and packaged in the same package. The packaging can be completed by a single-pad frame. It can be understood that in another embodiment, the linear conversion circuit 201 can also be fully integrated with at least part of the DC-DC conversion circuit 202, that is, the first control circuit 2011 and the first switch transistor Q01 are integrated with at least part of the DC-DC conversion circuit 202. The integration modes are not listed herein. As shown in FIGS. 4 and 5, in the LED driving system of the present disclosure, at least part of the linear conversion circuit 201, at least part of the DC-DC conversion circuit 202, and at least part of the LED driving circuit 40 can be integrated on the same chip or on different chips and packaged in the same package. The packaging can be completed by a single-pad frame. For example, in an embodiment, the second control circuit 2021, the second switch transistor Q02, and at least part of the LED driving circuit can be integrated on the same chip. In another embodiment, the second control circuit 2021, the second switch transistor Q02, and at least part of the LED driving circuit can be integrated on different chips and packaged in the same package. The packaging can be completed by a single-pad frame. In an embodiment, the second control circuit 2021, the second switch transistor Q02, the first switch transistor Q01, and at least part of the LED driving circuit can be integrated on the same chip. In another embodiment, the second control circuit 2021, the second switch transistor Q02, the first switch transistor Q01, and at least part of the LED driving circuits can be integrated on different chips and packaged in the same package. The packaging can be completed by a single-pad frame. These packaging modes can be completed by a single-pad frame, thereby reducing packaging costs. The LED driving system of the present disclosure is simpler, has lower cost, and meets the requirements of high conversion efficiency and high integration.

Figure 6:
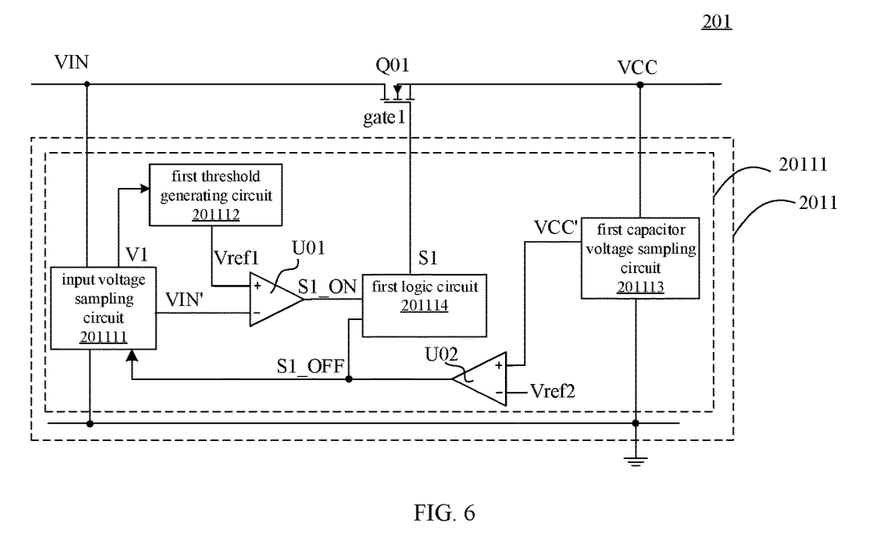
FIG. 6 is a structural diagram of a linear conversion circuit according to a first embodiment of the present disclosure.
Figure 7:
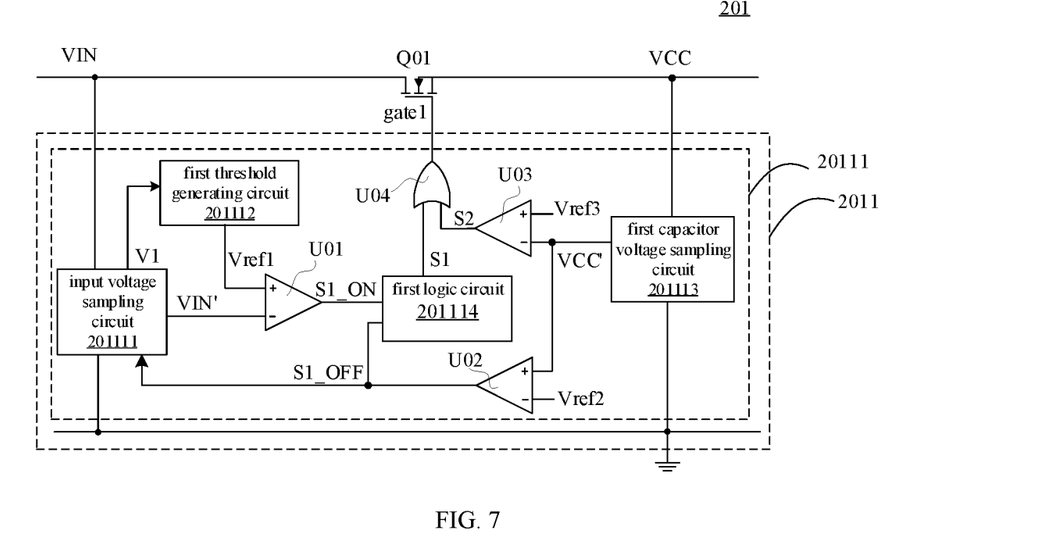
FIG. 7 is a structural diagram of the linear conversion circuit according to a second embodiment of the present disclosure.
Figure 8:
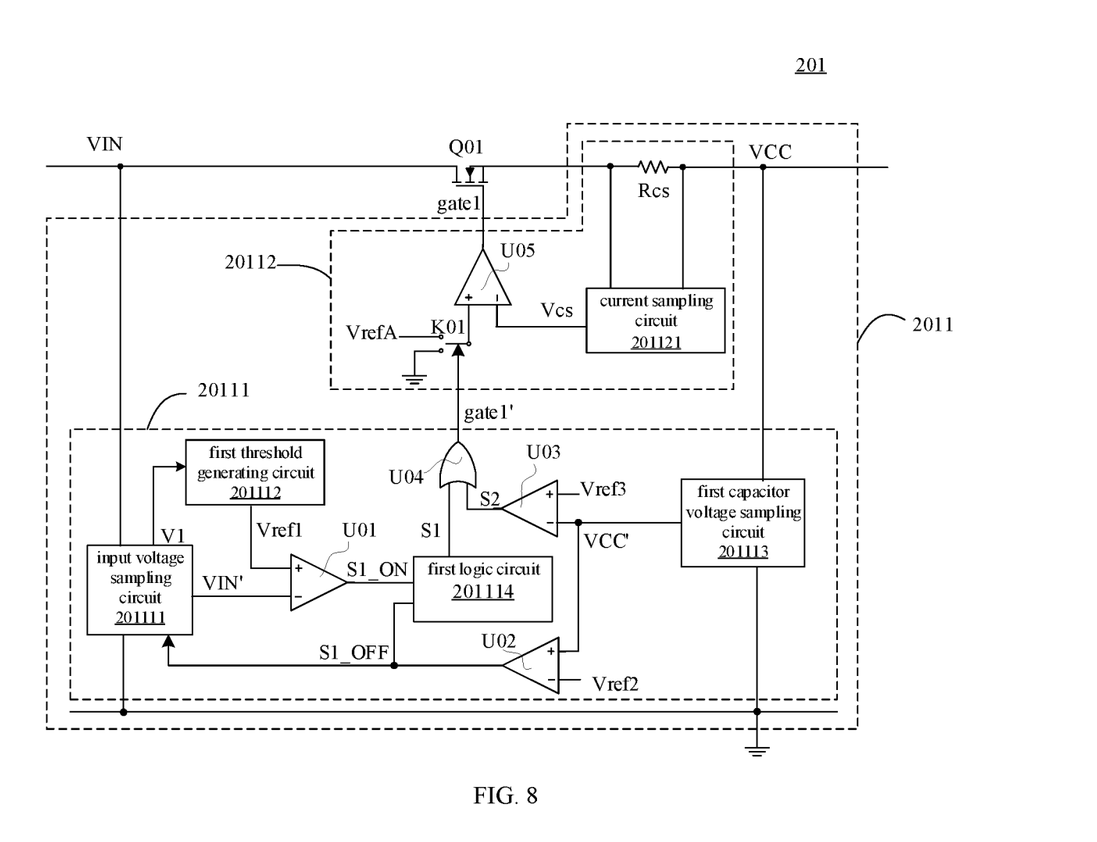
FIG. 8 is a structural diagram of the linear conversion circuit according to a third embodiment of the present disclosure.
Figure 9:
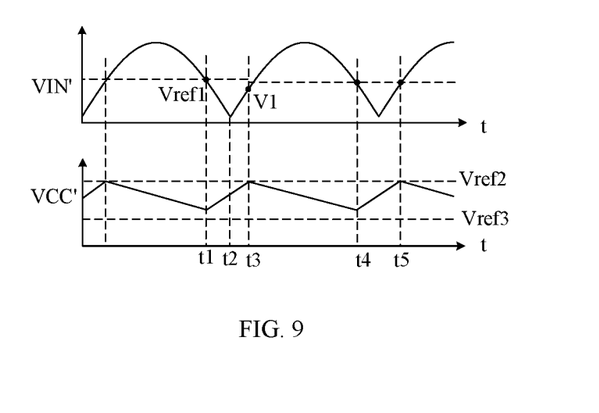
FIG. 9 is a wave diagram of a first rectified voltage sampled signal and a first capacitor voltage sampled signal according to an embodiment of the present disclosure.

Taking the three embodiments of the linear conversion circuit shown in FIGS. 6 to 8 as examples, the structure and operating principle of the linear conversion circuit 201 are introduced in combination with FIG. 9. As shown in FIGS. 6 to 8, in the linear conversion circuit 201, the first control circuit 2011 includes first switch control circuit 20111. The first switch control circuit 20111 receives the first rectified voltage VIN and the first capacitor voltage VCC to generate a first switch signal. The first control circuit 2011 generates the first control signal gate1 according to the first switch signal.

FIG. 6 is a schematic diagram of a first embodiment of the linear conversion circuit. In this embodiment, the first control circuit 2011 includes the first switch control circuit 20111. The first switch control circuit 20111 includes input voltage sampling circuit 201111, first threshold generating circuit 201112, first comparison circuit U01, first capacitor voltage sampling circuit 201113, second comparison circuit U02, and first logic circuit 201114. The input voltage sampling circuit 201111 samples the first rectified voltage VIN to output first rectified voltage sampled signal VIN' and first voltage V1. The first voltage V1 is the first rectified voltage sampled signal at the time when charging the first capacitor is stopping. In this embodiment, the first voltage V1 is the first rectified voltage sampled signal at the time when the first switch Q01 is starting to turn off. The first threshold generating circuit 201112 is configured to output first threshold Vref1, and the first threshold generating circuit 201112 adjusts the first threshold Vref1 according to the first voltage V1. The first comparison circuit U01 has a first input terminal for receiving the first threshold Vref1, and a second input terminal for receiving the first rectified voltage sampled signal VIN' and generating first on signal S1_ON according to a comparison result between the first rectified voltage sampled signal VIN' and the first threshold Vref1 to control the on of the first switch transistor Q01. The first capacitor voltage sampling circuit 201113 samples the first capacitor voltage VCC to output first capacitor voltage sampled signal VCC'. The second comparison circuit U02 has a first input terminal for receiving the first capacitor voltage sampled signal VCC', and a second input terminal for receiving second threshold Vref2 and generating first off signal S1_OFF according to a comparison result between the first capacitor voltage sampled signal VCC' and the second threshold Vref2 to control the off of the first switch transistor Q01. The first logic circuit 201114 receives the first on signal S1_ON and the first off signal S1_OFF to output first signal S1. When the first threshold Vref1 is greater than the first voltage V1, the first threshold generating circuit 201112 controls the first threshold Vref1 to decrease. When the first threshold Vref1 is less than the first voltage V1, the first threshold generating circuit 201112 controls the first threshold Vref1 to increase. In an embodiment, the input voltage sampling circuit 201111 generates the first voltage V1 according to the first off signal S1_OFF. The first switch control circuit 20111 outputs the first signal S1 as the first switch signal. The first control circuit 2011 outputs the first switch signal as the first control signal gate1.

Referring to FIGS. 6 and 9, in this embodiment, when the first rectified voltage sampled signal VIN' drops to the first threshold Vref1, the first on signal S1_ON output by the first comparison circuit U01 shown in FIG. 6 is flipped. The first logic circuit 201114 controls the first signal S1 to flip from invalid to valid according to the first on signal S1_ON. Accordingly, the first control signal gate1 flips from invalid to valid to control the first switch Q01 to be on, and charging of the first capacitor C01 is started. This time corresponds to time t1 and time t4 shown in FIG. 9. When the first capacitor voltage sampled signal VCC' rises to the second threshold Vref2, the first off signal S1_OFF output by the second comparison circuit U02 shown in FIG. 6 is flipped. The first logic circuit 201114 controls the first signal S1 to flip from valid to invalid according to the first off signal S1_OFF. Accordingly, the first control signal gate1 flips from valid to invalid to control the first switch Q01 to be off, and the charging of the first capacitor C01 is stopped. This time corresponds to time t3 and time t5 shown in FIG. 9. In FIG. 9, the time t1 and the time t4 are the times when charging the first capacitor C01 is starting, the time t2 is the time when the first rectified voltage VIN is at the trough, and the time t3 and the time t5 are times when charging the first capacitor C01 is stopping. In an embodiment, the first threshold generating circuit 201112 shown in FIG. 6 outputs the first voltage V1 at the time t3 shown in FIG. 9. The first threshold generating circuit 201112 determines that the first threshold Vref1 is greater than the first voltage V1 and controls the first threshold Vref1 to decrease. Therefore, in the next charging cycle shown in FIG. 9, the first threshold corresponding to the time (the time t4) when charging the first capacitor is starting is less than the first threshold corresponding to the time t1. Accordingly, in this charging cycle, the first voltage output by the first threshold generating circuit 201112 at the time (the time t5) when charging the first capacitor is stopping is equal to or close to the first threshold. In this way, the charging efficiency is improved.

In this embodiment, the first control circuit 2011 controls the first switch transistor to be on when the first rectified voltage sampled signal drops to the first threshold, thereby controlling the charging of the first capacitor to start. The first control circuit controls the first switch transistor to be off when the first capacitor voltage sampled signal rises to the second threshold, thereby controlling the charging of the first capacitor to stop. In this way, the first rectified voltage charges the first capacitor in the time period when the first rectified voltage is near the trough, and the first threshold is dynamically adjusted to optimize the charging efficiency, thereby further improving the conversion efficiency of the linear conversion circuit 201.

FIG. 7 is a schematic diagram of a second embodiment of the linear conversion circuit. In this embodiment, the structure of the first control circuit 2011 is basically the same as that of the first control circuit in the first embodiment and will not be repeated herein. The difference is that the first switch control circuit 20111 of this embodiment further includes third comparison circuit U03 and first OR logic circuit U04. The third comparison circuit U03 has a first input terminal for receiving third threshold Vref3 and a second input terminal for receiving the first capacitor voltage sampled signal VCC' and generating second signal S2 according to a comparison result between the first capacitor voltage sampled signal VCC' and the third threshold Vref3. The first OR logic circuit U04 has a first input terminal for receiving the first signal S1 and a second input terminal for receiving the second signal S2 and performing an OR logic operation on the first signal S1 and the second signal S2. The first switch control circuit 20111 takes an output signal of the first OR logic circuit U04 as the first switch signal to output, and the first control circuit 2011 outputs the first switch signal as the first control signal gate1.

In this embodiment, when the first capacitor voltage sampled signal VCC' is less than the third threshold Vref3, the second signal S2 output by the third comparison circuit U03 is valid. Accordingly, the first control signal gate1 is also valid. The first switch transistor Q01 is turned on, and the charging of the first capacitor C01 is started. Therefore, different from the first embodiment, in this embodiment, the first control circuit 2011 controls the first switch transistor to be on when the first rectified voltage sampled signal drops to the first threshold or the first capacitor voltage sampled signal is less than the third threshold, thereby controlling the charging of the first capacitor to start. Compared with that in the first embodiment, the first capacitor voltage in this embodiment is low during the startup phase. Charging of the first capacitor is controlled to start from the beginning of power-on to realize the fast startup of the first capacitor voltage VCC, enabling the power supply circuit to output the valid supply voltage Vo earlier. In this embodiment, after the power supply circuit is started, the first capacitor voltage VCC is greater than the third threshold, and the first control circuit 2011 changes to control the charging of the first capacitor to start when the first rectified voltage sampled signal drops to the first threshold and controls the charging of the first capacitor to stop when the first capacitor voltage sampled signal rises to the second threshold. In this way, the first rectified voltage charges the first capacitor in the time period when the first rectified voltage is near the trough, and the first threshold is dynamically adjusted to optimize the charging efficiency, thereby further improving the conversion efficiency of the linear conversion circuit.

FIG. 8 is a schematic diagram of a third embodiment of the linear conversion circuit of the present disclosure. In this embodiment, the first control circuit 2011 includes first switch control circuit 20111 and current limiting circuit 20112. The structure of the first switch control circuit 20111 is the same as that of the first switch control circuit in the second embodiment and will not be repeated herein. In this embodiment, the current limiting circuit 20112 is configured to limit a current when the first switch transistor Q01 is on. The current limiting circuit 20112 samples a current of the first switch transistor Q01 to acquire a first sampled signal Vcs and outputs the first control signal gate1 according to the first sampled signal Vcs and first switch signal gate' output by the first switch control circuit 20111. As an example, in an embodiment, the current limiting circuit 20112 includes sampling resistor Rcs, current sampling circuit 201121, selective switch K01, and first operational amplifier U05. The sampling resistor Rcs is connected in series with the first switch transistor Q01. The current sampling circuit 201121 is connected to two terminals of the sampling resistor Rcs to output the first sampled signal Vcs representing the current of the first switch transistor Q01. The first operational amplifier U05 has a first input terminal connected to an output terminal of the selective switch K01 and receiving the first sampled signal Vcs. The selective switch K01 has a first input terminal for receiving reference voltage VrefA, a second input terminal grounded, and a control terminal connected to an output terminal of the first switch control circuit 20111 to receive the first switch signal gate'.

In this embodiment, when the first switch signal gate' is valid, the selective switch K01 selects to connect the reference voltage VrefA to the first input terminal of the first amplifier U05. At this time, the first control signal gate1 output by the first operational amplifier U05 is valid. The first switch transistor Q01 is on, and the first capacitor C01 is charged. The first operational amplifier U05 regulates the first control signal gate1 according to the reference voltage VrefA and the first sampled signal Vcs to limit the current flowing through the first switch transistor Q01, thereby limiting the current charging the first capacitor C01. When the first switch signal gate' is invalid, the selective switch K01 selects to connect the ground to the first input terminal of the first amplifier U05. At this time, the first control signal gate1 output by the first amplifier U05 is invalid, and the first switch transistor Q01 is off. Compared with the second embodiment, in this embodiment, the current limiting circuit 20112 limits the current for charging the first capacitor, thereby improving the harmonics of the input current.

It should be noted that to facilitate understanding, the present disclosure introduces the structure and working principle of the linear conversion circuit by taking the three embodiments of the linear conversion circuit shown in FIGS. 6 to 8 as examples. In the above three embodiments, the linear conversion circuit controls the charging of the first capacitor to stop when the first capacitor voltage sampled signal rises to the second threshold and adjusts the first threshold according to the first rectified voltage at the time when charging the first capacitor is stopping to further improve the conversion efficiency. Understandably, in another embodiment, the linear conversion circuit can control the charging of the first capacitor to stop when the first capacitor voltage sampled signal rises to the second threshold and adjust the first threshold according to the first capacitor voltage sampled signal at the time of when charging the first capacitor is starting. The linear conversion circuit can also control the charging of the first capacitor to stop when the first rectified voltage sampled signal rises to the fourth threshold and adjust the first threshold according to the first capacitor voltage sampled signal at the time when charging the first capacitor is starting. The linear conversion circuit can also control the charging of the first capacitor to stop when the first rectified voltage sampled signal rises to the fourth threshold and adjust the first threshold according to the first capacitor voltage sampled signal at the time when charging the first capacitor is stopping. As a further example, if the first threshold is adjusted according to the first capacitor voltage sampled signal at the time when charging the first capacitor is starting, the first threshold can be controlled to decrease when the first capacitor voltage sampled signal at the time when charging the first capacitor is starting is greater than a preset value. When the first capacitor voltage sampled signal at the time when charging the first capacitor is starting is less than the preset value, the first threshold is controlled to increase. If the first threshold is adjusted according to the first capacitor voltage sampled signal at the time when charging the first capacitor is stopping, the first threshold can be decreased when the first capacitor voltage sampled signal at the time when the first capacitor charging is stopping is greater than the preset value. When the first capacitor voltage sampled signal at the time when the first capacitor charging is stopping is less than the preset value, the first threshold is controlled to increase. Those skilled in the art can easily derive the specific circuit structure of the above solution based on the content herein, which will not be repeated herein.

The implementations described above do not constitute a limitation on the scope of protection of the technical solution of the present disclosure. Any modification, equivalent replacement, and improvement made within the spirit and principle of the above implementations should fall within the scope of protection of the technical solution of the present disclosure.

What is claimed is:
1. A power supply circuit configured to provide a supply voltage for a load and comprising a linear conversion circuit, a first capacitor, and a direct current—direct current (DC-DC) conversion circuit, wherein an alternating current (AC) input signal is rectified to form a first rectified voltage;

the linear conversion circuit receives the first rectified voltage and has an output terminal connected to the first capacitor; and after the power supply circuit is started, the linear conversion circuit controls the first rectified voltage to charge the first capacitor in a time period when the first rectified voltage is near a trough; and the DC-DC conversion circuit receives a first capacitor voltage and performs power conversion to output the supply voltage, wherein the linear conversion circuit controls a charging of the first capacitor to start when a first rectified voltage sampled signal drops to a first threshold or the linear conversion circuit controls the charging of the first capacitor to start when the first rectified voltage sampled signal drops to the first threshold or a first capacitor voltage sampled signal is less than a third threshold.

2. The power supply circuit according to claim 1, wherein the linear conversion circuit controls the charging of the first capacitor to stop when the first capacitor voltage sampled signal rises to a second threshold;

the first threshold is adjusted according to the first rectified voltage sampled signal at a time when charging the first capacitor is stopping; or the first threshold is adjusted according to the first capacitor voltage sampled signal at a time when charging the first capacitor is starting;

wherein the linear conversion circuit controls the first threshold to decrease when the first threshold is greater than a first voltage; and the linear conversion circuit controls the first threshold to increase when the first threshold is less than the first voltage;

wherein, the first voltage is a voltage value of the first rectified voltage sampled signal at the time when charging the first capacitor is stopping.

3. The power supply circuit according to claim 1, wherein the linear conversion circuit controls the charging of the first capacitor to stop when the first rectified voltage sampled signal rises to a fourth threshold;

the first threshold is adjusted according to the first capacitor voltage sampled signal at a time when charging the first capacitor is starting; or the first threshold is adjusted according to the first capacitor voltage sampled signal at a time when charging the first capacitor is stopping.

4. A power supply circuit configured to provide a supply voltage for a load and comprising a linear conversion circuit, a first capacitor, and a direct current-direct current (DC-DC) conversion circuit, wherein an alternating current (AC) input signal is rectified to form a first rectified voltage;

the linear conversion circuit receives the first rectified voltage and has an output terminal connected to the first capacitor; and after the power supply circuit is started, the linear conversion circuit controls the first rectified voltage to charge the first capacitor in a time period when the first rectified voltage is near a trough; and the DC-DC conversion circuit receives a first capacitor voltage and performs power conversion to output the supply voltage, wherein the DC-DC conversion circuit comprises a switch circuit and a second control circuit; the switch circuit comprises a second switch transistor on a high side and a third switch transistor on a low side; and the second control circuit generates a second switch signal according to an output feedback signal of the DC-DC conversion circuit to control on and off of the second switch transistor.

5. The power supply circuit according to claim 4, wherein the second control circuit and the second switch transistor are integrated on a same chip or in a same single-pad package.

6. The power supply circuit according to claim 5, wherein at least part of the linear conversion circuit is integrated on the same chip or in the same single-pad package.

7. The power supply circuit according to claim 1, wherein the linear conversion circuit comprises a first switch transistor and a first control circuit, wherein the first switch transistor has a first power terminal for receiving the first rectified voltage and a second power terminal connected to the first capacitor; and the first control circuit comprises a first switch control circuit, the first switch control circuit receives the first rectified voltage and the first capacitor voltage to generate a first switch signal; the first control circuit generates a first control signal according to the first switch signal; the first switch transistor further has a control terminal for receiving the first control signal; and the first control signal controls on and off of the first switch transistor.

8. The power supply circuit according to claim 7, wherein the first switch control circuit comprises:

an input voltage sampling circuit configured to sample the first rectified voltage to output the first rectified voltage sampled signal and a first voltage, wherein the first voltage is a voltage value of the first rectified voltage sampled signal at a time when the first switch transistor is starting to turn off;

a first threshold generating circuit configured to output the first threshold and adjust the first threshold according to the first voltage;

a first comparison circuit having a first input terminal for receiving the first threshold, and a second input terminal for receiving the first rectified voltage sampled signal and generating a first on signal according to a comparison result between the first rectified voltage sampled signal and the first threshold;

a first capacitor voltage sampling circuit configured to sample the first capacitor voltage to output the first capacitor voltage sampled signal;

a second comparison circuit having a first input terminal for receiving the first capacitor voltage sampled signal, and a second input terminal for receiving a second threshold and generating a first off signal according to a comparison result between the first capacitor voltage sampled signal and the second threshold; and a first logic circuit configured to receive the first on signal and the first off signal to output a first signal, wherein the first switch control circuit outputs the first signal as the first switch signal.

9. The power supply circuit according to claim 8, wherein the first switch control circuit further comprises:

a third comparison circuit having a first input terminal for receiving the third threshold, and a second input terminal for receiving the first capacitor voltage sampled signal and generating a second signal according to a comparison result between the first capacitor voltage sampled signal and the third threshold; and a first OR logic circuit having a first input terminal for receiving the first signal, and a second input terminal for receiving the second signal and performing an OR logic operation on the first signal and the second signal, wherein the first switch control circuit takes an output signal of the first OR logic circuit as the first switch signal to output.

10. The power supply circuit according to claim 7, wherein the first control circuit outputs the first switch signal as the first control signal.

11. The power supply circuit according to claim 7, wherein the first control circuit further comprises a current limiting circuit configured to limit a current when the first switch transistor is on, wherein the current limiting circuit samples a current of the first switch transistor to acquire a first sampled signal and outputs the first control signal according to the first sampled signal and the first switch signal.

12. The power supply circuit according to claim 7, wherein the DC-DC conversion circuit comprises a switch circuit and a second control circuit; the switch circuit comprises a second switch transistor on a high side and a third switch transistor on a low side; and the second control circuit generates a second switch signal according to an output feedback signal of the DC-DC conversion circuit to control on and off of the second switch transistor; and the second control circuit, the second switch transistor, and the first switch transistor are integrated on a same chip or in a same single-pad package.

13. The power supply circuit according to claim 1, wherein the first capacitor voltage is 30-70 V.

14. A light-emitting diode (LED) driving system, comprising a rectifying circuit, a wireless module, an LED driving circuit, and a power supply circuit, wherein the power supply circuit is configured to provide a supply voltage for a load and comprising a linear conversion circuit, a first capacitor, and a direct current-direct current (DC-DC) conversion circuit, wherein an alternating current (AC) input signal is rectified to form a first rectified voltage;

the linear conversion circuit receives the first rectified voltage and has an output terminal connected to the first capacitor; and after the power supply circuit is started, the linear conversion circuit controls the first rectified voltage to charge the first capacitor in a time period when the first rectified voltage is near a trough; and the DC-DC conversion circuit receives a first capacitor voltage and performs power conversion to output the supply voltage, wherein the rectifying circuit is connected to an AC input power supply and is configured to rectify an AC input signal and output the first rectified voltage;

the power supply circuit is configured to receive the first rectified voltage and output the supply voltage, wherein the supply voltage is configured for supplying power to the wireless module;

the wireless module is configured to output a dimming signal; and the LED driving circuit is configured to provide a driving current for an LED load, and the LED driving circuit is configured to receive the dimming signal to adjust the driving current, wherein at least part of the linear conversion circuit, at least part of the DC-DC conversion circuit, and at least part of the LED driving circuit are integrated on a same chip or in a same single-pad package.

15. The LED driving system according to claim 14, wherein a second control circuit, a second switch transistor, a first switch transistor, and at least part of the LED driving circuit are integrated on a same chip or in a same single-pad package.

16. The LED driving system according to claim 14, wherein the rectifying circuit comprises a rectifier bridge; and the rectifier bridge receives the AC input signal to output the first rectified voltage, and the LED driving circuit has an input terminal for receiving the first rectified voltage.

17. The LED driving system according to claim 14, wherein the rectifying circuit comprises a rectifier bridge and a unidirectional conducting device, wherein the rectifier bridge receives the AC input signal to output a second rectified voltage, and the LED driving circuit has an input terminal for receiving a second rectified voltage; and the unidirectional conducting device has a positive electrode connected to one terminal of the AC input power supply and a negative electrode connected to a first input terminal of the power supply circuit; and a second input terminal of the power supply circuit is grounded.

18. The LED driving system according to claim 14, wherein the wireless module comprises at least one selected from the group consisting of a wireless fidelity (Wi-Fi) module, a Bluetooth module, and a ZigBee module.

* * * * *